(12) United States Patent
Van Leeuwen et al.

(10) Patent No.: US 12,456,510 B2
(45) Date of Patent: Oct. 28, 2025

(54) MEMORY DEVICE CONTROL SCHEMES, AND ASSOCIATED METHODS, DEVICES, AND SYSTEMS

(71) Applicant: Micron Technology, Inc., Boise, ID (US)

(72) Inventors: Brenton Van Leeuwen, Boise, ID (US); Christopher J. Kawamura, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 84 days.

(21) Appl. No.: 17/645,253

(22) Filed: Dec. 20, 2021

(65) Prior Publication Data

US 2023/0197140 A1 Jun. 22, 2023

(51) Int. Cl.
*G11C 11/408* (2006.01)
*G11C 5/06* (2006.01)
*G11C 11/4093* (2006.01)
*G11C 11/4096* (2006.01)

(52) U.S. Cl.
CPC .......... *G11C 11/4085* (2013.01); *G11C 5/063* (2013.01); *G11C 11/4093* (2013.01); *G11C 11/4096* (2013.01)

(58) Field of Classification Search
CPC ............................ G11C 11/4085; G11C 5/063

USPC ...................................................... 365/230.06
See application file for complete search history.

(56) References Cited

U.S. PATENT DOCUMENTS

| | | | |
|---|---|---|---|
| 2011/0261613 A1* | 10/2011 | Pyeon | G11C 13/0004 365/163 |
| 2012/0008398 A1* | 1/2012 | Kwon | G11C 16/06 365/185.13 |
| 2016/0049201 A1* | 2/2016 | Lue | G11C 16/16 365/185.11 |
| 2021/0057009 A1 | 2/2021 | Kim | |
| 2021/0265259 A1* | 8/2021 | Niki | H10B 63/80 |

OTHER PUBLICATIONS

Kawamura et al., Word Line Driver Circuitry Including Shared Driver Gates, And Associated Methods, Devices, And Systems, filed Dec. 7, 2021, U.S. Appl. No. 17/544,219, 51 pages.

* cited by examiner

*Primary Examiner* — Anthan Tran
(74) *Attorney, Agent, or Firm* — TraskBritt

(57) ABSTRACT

Methods of operating memory devices are disclosed. A method may include activating a first, target word line. The method may also include coupling a second word line adjacent the first, target word line to an associated first main word line while the first, target word line is activated. Further, the method may include coupling the associated main word line to a negative word line voltage while the first, target word line is activated. Associated circuits, devices, and systems are also disclosed.

13 Claims, 10 Drawing Sheets

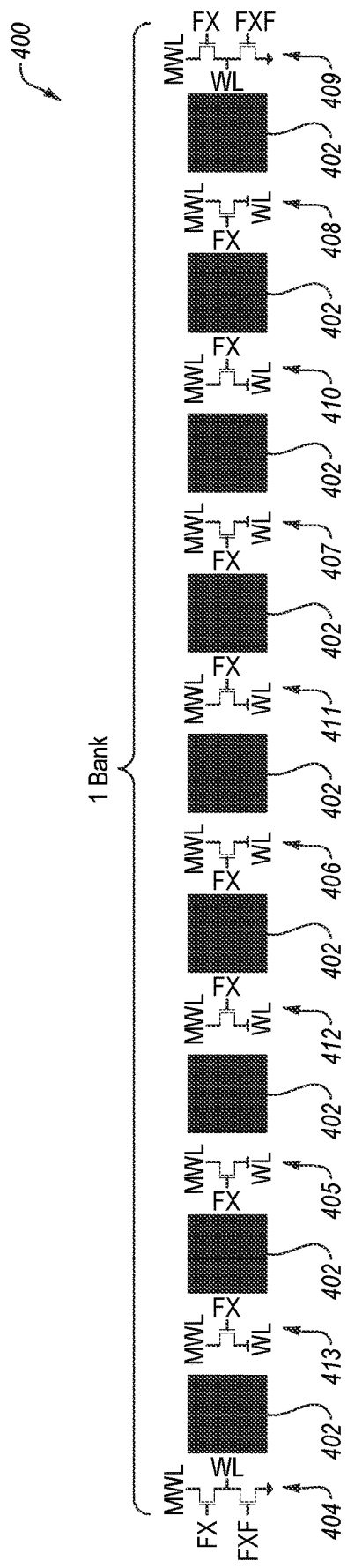

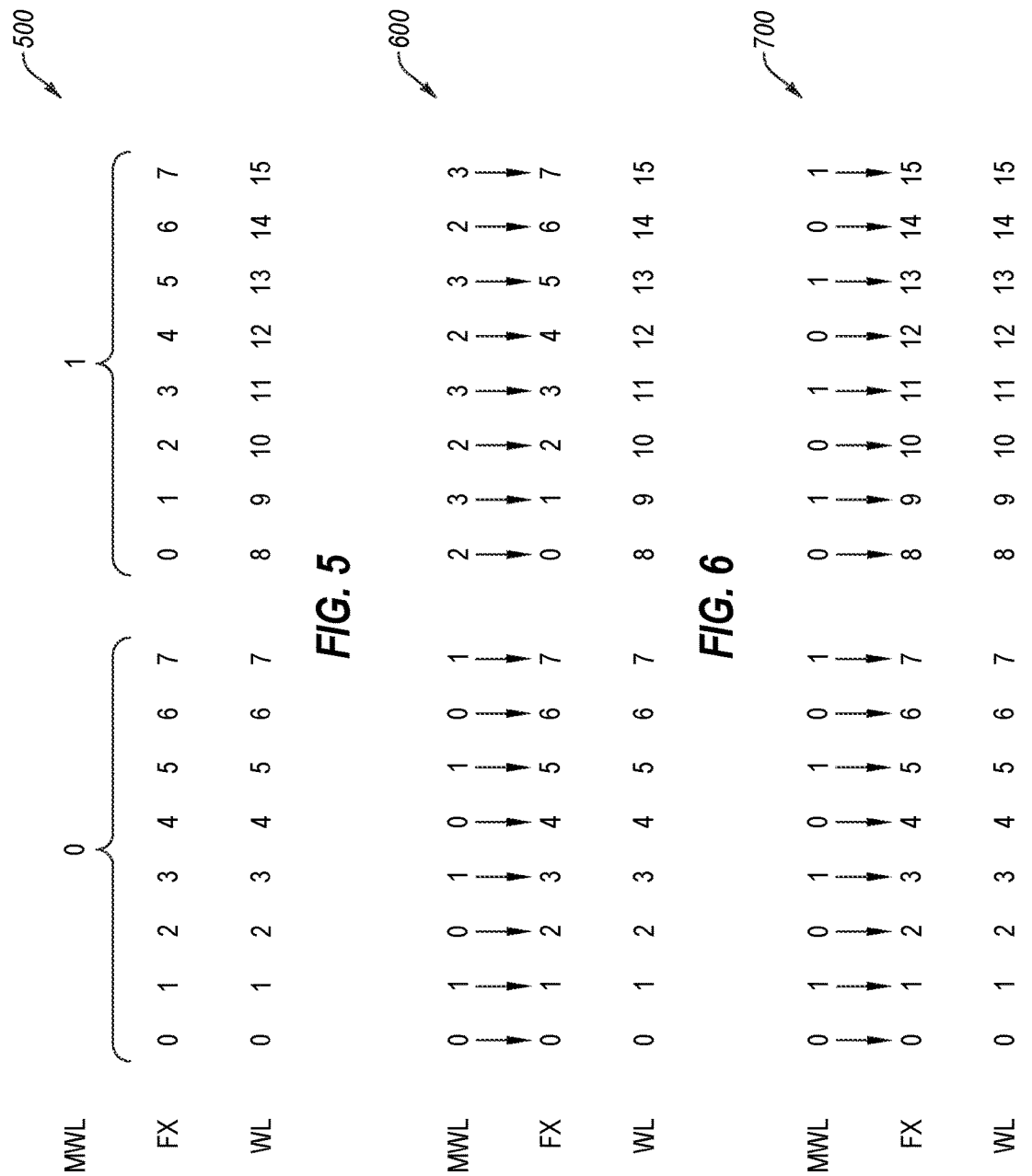

MEMORY DEVICE CONTROL SCHEMES, AND ASSOCIATED METHODS, DEVICES, AND SYSTEMS

TECHNICAL FIELD

Embodiments of the disclosure relate to memory device control schemes. More specifically, various embodiments relate to controlling word line driver circuitry of memory devices, and to related methods, devices, and systems.

BACKGROUND

Memory devices are typically provided as internal, semiconductor, integrated circuits in computers or other electronic systems. There are many different types of memory including, for example, random access memory (RAM), read only memory (ROM), dynamic random access memory (DRAM), synchronous dynamic random access memory (SDRAM), resistive random access memory (RRAM), double data rate memory (DDR), low power double data rate memory (LPDDR), phase change memory (PCM), and Flash memory.

Memory devices typically include many memory cells that are capable of holding a charge that is representative of a bit of data. Typically, these memory cells are arranged in a memory array. Data may be written to or retrieved from a memory cell by selectively activating the memory cell via an associated word line driver.

BRIEF DESCRIPTION OF THE DRAWINGS

FIG. 4 depicts a portion of an example device including a memory bank having a number of memory mats, in accordance with various embodiments of the disclosure.

FIG. 5 includes a diagram illustrating a conventional control scheme.

FIG. 6 includes a diagram illustrating a control scheme, according to various embodiments of the disclosure.

FIG. 7 includes a diagram illustrating another control scheme, in accordance with various embodiments of the disclosure.

DETAILED DESCRIPTION

Figure 1:
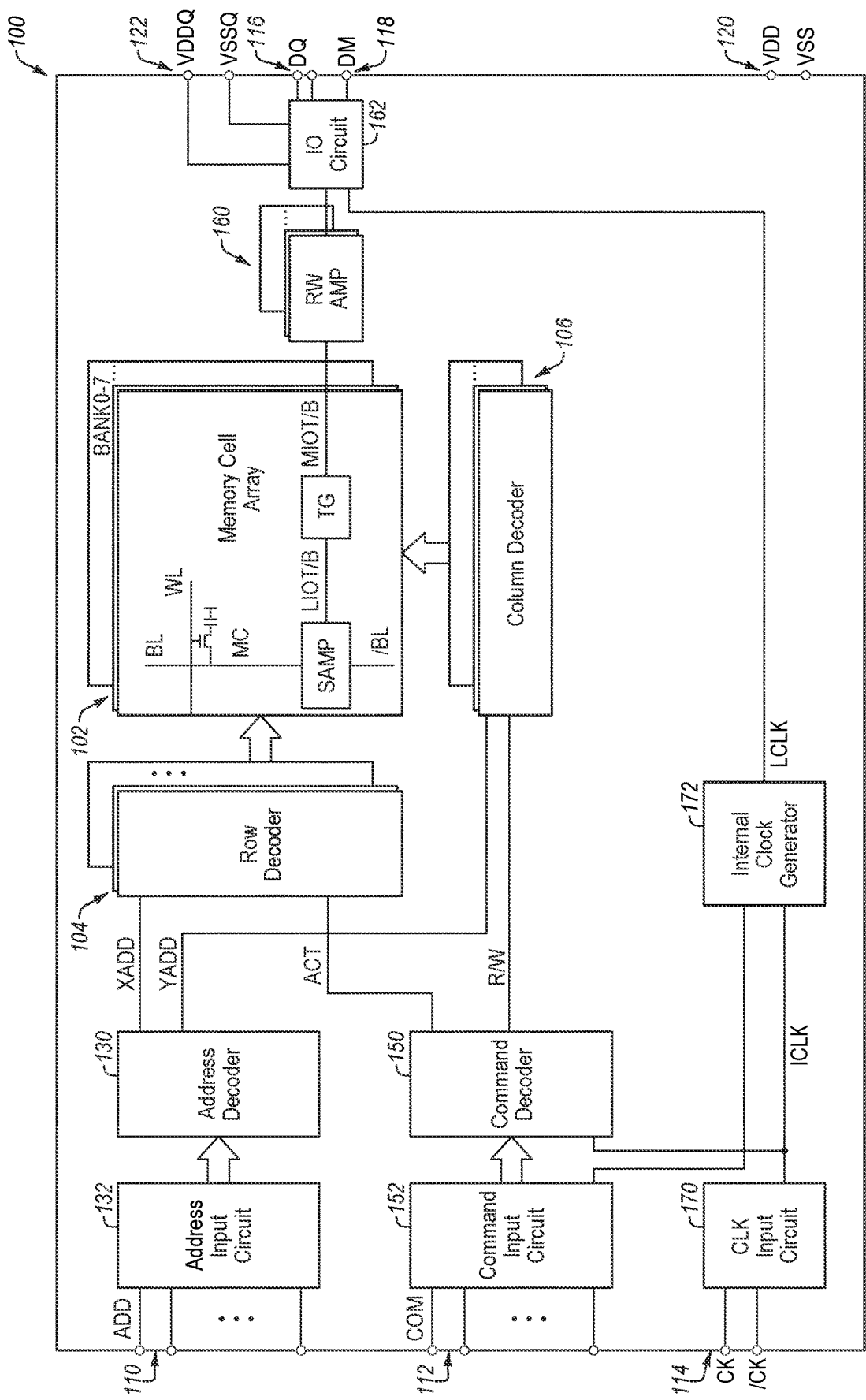
FIG. 1 is a block diagram of an example memory device, according to various embodiments of the disclosure.

Memory typically includes many memory cells arranged in a two-dimensional array of intersecting rows and columns. Data is written to or retrieved from the memory cells by selectively applying activation voltages to word lines (i.e., access lines) and bit lines (i.e., data lines). In general, word lines activate memory cells and bit lines provide data to or retrieve data from the activated memory cells.

When memory access is desired, an activation voltage may be applied to a word line by a word line driver to enable a desired function (e.g., read or write) to be performed. More particularly, when an activation voltage (e.g., a high voltage) is applied via a word line, circuitry (e.g., a passgate transistor) in a memory cell may enable a bit line to write data to or retrieve data from the activated memory cell. When memory access is not needed, the word line driver may apply a deactivation voltage (e.g., a low voltage or ground voltage).

In some conventional memory devices, word lines are terminated before a word line driver gap and, in these devices, word lines are routed, for example, to contact word line driver circuitry (e.g., from above). In some other memory devices, word lines may extend through a number of word line driver gaps and contact word line driver circuitry (e.g., from below), and thus, in these devices, a word line extends an entire length of a memory bank. A word line extending a length of an entire memory bank (e.g., a continuous word line) may eliminate the need to have pull-down devices in each gap of the word line driver circuitry. In these devices, a single pull-down device (e.g., at an edge of a memory bank) may couple the word line to a LOW voltage (e.g., a negative word line voltage VNWL). However, as described more fully below, coupling a word line to a negative word line voltage via a single pull-down device (i.e., weakly coupling the word line to the negative word line voltage in one gap) may not be sufficient to prevent inactive word lines from coupling to an adjacent, active word line.

Various embodiments disclosed herein relate to various control schemes for controlling word lines of a memory device. In various embodiments described herein, one or more inactive word lines adjacent a target word line (i.e., an activated word line) may be coupled to a negative word line voltage (e.g., in more than one gap). More specifically, one or more word lines adjacent the target word line may be coupled to the negative word line voltage in each gap (e.g., strongly coupling one or more word lines adjacent the target word line to the negative word line voltage (e.g., in each gap)). Yet more specifically, a word line adjacent the target word line may be coupled to an associated main word line, and the associated main word line may be coupled to the negative word line voltage (e.g., in each gap of the word line driver circuitry). In at least some embodiments, adjacent word lines may be coupled to the negative word line voltage in each sub word line driver (SWD) gap without both a pull-up device and a pull-down device in each gap.

Although various embodiments are described herein with reference to memory devices, the disclosure is not so limited, and the embodiments may be generally applicable to microelectronic devices that may or may not include semiconductor devices and/or memory devices. Embodiments of the disclosure will now explained with reference to the accompanying drawings.

FIG. 1 includes a block diagram of an example memory device 100, according to various embodiments of the disclosure. Memory device 100 may include, for example, a DRAM (dynamic random access memory), a SRAM (static random access memory), a SDRAM (synchronous dynamic random access memory), a DDR SDRAM (double data rate DRAM, such as a DDR4 SDRAM and the like), or a SGRAM (synchronous graphics random access memory). Memory device 100, which may be integrated on a semiconductor chip, may include a memory cell array 102.

In the embodiment of FIG. 1, memory cell array 102 is shown as including eight memory banks BANK0-7. More or fewer banks may be included in memory cell array 102 of other embodiments. Each memory bank includes a number of access lines (word lines WL), a number of data lines (bit lines BL) and /BL, and a number of memory cells MC arranged at intersections of the number of word lines WL and the number of bit lines BL and /BL. The selection of a word line WL may be performed by a row decoder 104 and the selection of the bit lines BL and /BL may be performed by a column decoder 106. In the embodiment of FIG. 1, row decoder 104 may include a respective row decoder for each memory bank BANK0-7, and column decoder 106 may include a respective column decoder for each memory bank BANK0-7.

Bit lines BL and /BL are coupled to a respective sense amplifier SAMP. Read data from bit line BL or /BL may be amplified by sense amplifier SAMP, and transferred to read/write amplifiers 160 over complementary local data lines (LIOT/B), transfer gate (TG), and complementary main data lines (MIOT/B). Conversely, write data outputted from read/write amplifiers 160 may be transferred to sense amplifier SAMP over complementary main data lines MIOT/B, transfer gate TG, and complementary local data lines LIOT/B, and written in memory cell MC coupled to bit line BL or /BL.

Memory device 100 may be generally configured to be receive various inputs (e.g., from an external controller) via various terminals, such as address terminals 110, command terminals 112, clock terminals 114, data terminals 116, and data mask terminals 118. Memory device 100 may include additional terminals such as power supply terminals 120 and 122.

During a contemplated operation, one or more command signals COM, received via command terminals 112, may be conveyed to a command decoder 150 via a command input circuit 152. Command decoder 150 may include a circuit configured to generate various internal commands via decoding one or more command signals COM. Examples of the internal commands include an active command ACT and a read/write signal R/W.

Further, one or more address signals ADD, received via address terminals 110, may be conveyed to an address decoder 130 via an address input circuit 132. Address decoder 130 may be configured to supply a row address XADD to row decoder 104 and a column address YADD to column decoder 106.

Active command ACT may include a pulse signal that is activated in response to a command signal COM indicating row access (e.g., an active command). In response to active signal ACT, row decoder 104 of a specified bank address may be activated. As a result, the word line WL specified by row address XADD may be selected and activated.

Read/write signal RAY may include a pulse signal that is activated in response to a command signal COM indicating column access (e.g., a read command or a write command). In response to read/write signal R/W, column decoder 106 may be activated, and the bit line BL specified by column address YADD may be selected.

In response to active command ACT, a read signal, a row address XADD, and a column address YADD, data may be read from memory cell MC specified by row address XADD and column address YADD. The read data may be output via a sense amplifier SAMP, a transfer gate TG, read/write amplifier 160, an input/output circuit 162, and data terminal 116. Further, in response to active command ACT, a write signal, a row address XADD, and a column address YADD, write data may be supplied to memory cell array 102 via data terminal 116, input/output circuit 162, read/write amplifier 160, transfer gate TG, and sense amplifier SAMP. The write data may be written to memory cell MC specified by row address XADD and column address YADD.

Clock signals CK and /CK may be received via clock terminals 114. A clock input circuit 170 may generate internal clock signals ICLK based on clock signals CK and ICK. Internal clock signals ICLK may be conveyed to various components of memory device 100, such as command decoder 150 and an internal clock generator 172. Internal clock generator 172 may generate internal clock signals LCLK, which may be conveyed to input/output circuit 162 (e.g., for controlling the operation timing of input/output circuit 162). Further, data mask terminals 118 may receive one or more data mask signals DM. When data mask signal DM is activated, overwrite of corresponding data may be prohibited.

Figure 2:
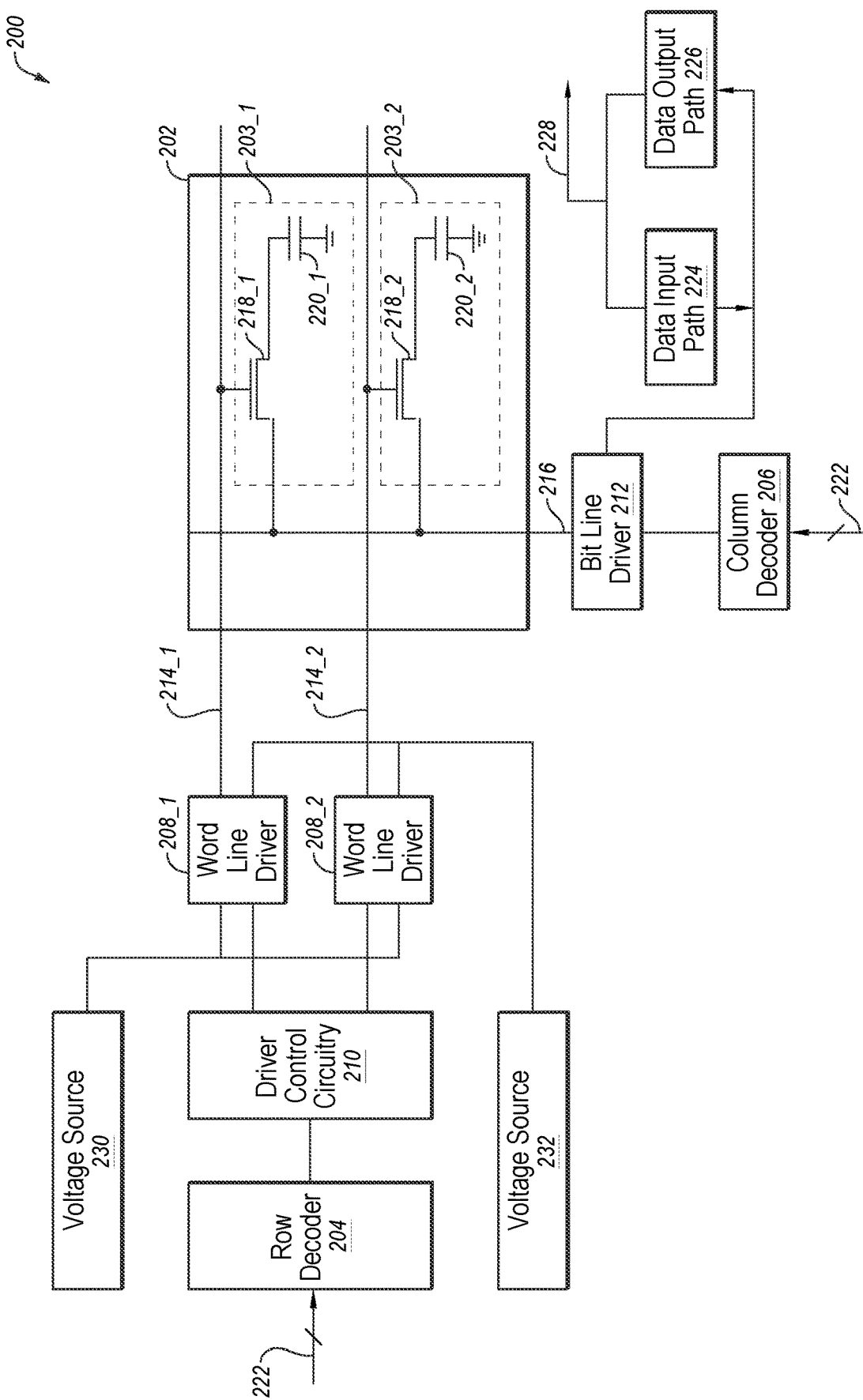
FIG. 2 is another, more specific block diagram of an example memory device, according to various embodiments of the disclosure.

FIG. 2 depicts another, more specific block diagram of an example memory device 200, according to various embodiments of the disclosure. Memory device 200, which may be part of memory device 100 of FIG. 1, includes a memory cell array 202 (e.g., memory cell array 102 of FIG. 1) with memory cells 203 arranged side-by-side, a row decoder 204 (e.g., row decoder 104 of FIG. 1) and a column decoder 206 (e.g., column decoder 106 of FIG. 1). Memory device 200 further includes word line driver circuitry including word line drivers 208 and driver control circuitry 210. Memory device 200 also includes a bit line driver 212. Memory device 200 further includes word lines 214 and a bit line 216 disposed adjacent to memory cells 203.

It is understood that a memory array (e.g., memory cell array 202 in FIG. 2) typically includes a number of memory cells arranged in rows and columns; however, for simplicity, only two such memory cells (i.e., memory cells 203_1 and memory cell 203_2) are shown in FIG. 2. Similarly, it will be understood that a memory device (e.g., memory device 200) may generally include any number of word line drivers, any number of word lines, and any number bit lines; however, for simplicity, only two word line drivers (e.g., word line driver 208_1 and word line driver 208_2), two word lines (i.e., word line 214_1 and word line 214_2) and one bit line (i.e., bit line 216) are shown in FIG. 2.

As will be appreciated, each memory cell 203 includes a passgate transistor 218 having its gate connected to an associated word line 214, its drain connected to bit line 216, and its source connected to an associated capacitor 220. Each word line 214 is driven by an associated word line driver 208 and each bit line 216 is driven by bit line driver 212.

Row decoder 204 and a column decoder 206 may be configured to decode address signals on address lines 222 to access memory cells 203. Data may be provided to memory cells 203 via a data input path 224, and data may be retrieved from memory cells 203 via a data output path 226. Data being transmitted to and from data input path 224 and data output path 226 may be carried on data lines 228.

Each word line driver 208 may be controlled by driver control circuitry 210, which may receive signals (i.e., from row decoder 204) that indicate which word line drivers 208 should apply activation voltages to word lines 214, and which word line drivers 208 should maintain deactivation voltages to word lines 214.

According to some embodiments, in an active mode (e.g., also referred to herein as a "row active mode," an "active phase," or an "active period"), driver control circuitry 210 conveys a high (e.g., a logic high state) signal to word line driver 208_1, and word line driver 208_1 may apply an activation voltage to word line 214_1 (and any other word lines that word line driver 208_1 is driving). The activation voltage (e.g., a supply voltage Vccp) may be provided by a voltage source 230 (also be referred to herein as a "high voltage source"), which is coupled to word line driver 208_1. The activation voltage may be applied to word line 214_1 to perform a memory access function (e.g., read or write function) on associated memory cell 203_1. More specifically, for example, the activation voltage may activate passgate transistor 218_1 to enable data transfer between memory cell 203_1 and data paths 224 and 226.

In an inactive mode (also referred to herein as a "standby phase," a "pre-charge mode" or a "pre-charge phase") (e.g., when no memory access function is being performed), word line driver 208_1 may apply a deactivation voltage to word line 214_1. The deactivation voltage (e.g., a ground voltage or a negative voltage) may be provided by a voltage source 232 (also be referred to herein as a "low voltage source"), which is coupled to word line driver 208_1. The application of a deactivation voltage may turn passgate transistor 218_1 OFF, thereby preventing any memory access function from being performed on memory cell 203_1.

Alternatively, in some embodiments, driver control circuitry 210 may cause word line driver 208_1 to apply an activation voltage (i.e., provided by voltage source 232) to word line 214_1. As such, the activation voltage (e.g., a ground voltage, low positive voltage, or a negative voltage) may activate passgate transistor 218_1 (e.g., a PMOS transistor) to enable data transfer between memory cell 203_1 and data paths 224 and 226. Additionally, in some embodiments, driver control circuitry 210 may cause word line driver 208_1 to apply a deactivation voltage (i.e., provided by voltage source 230) to word line 214_1. As such, the deactivation voltage (e.g., voltage Vccp) may turn passgate transistor 218_1 OFF, thereby preventing any memory access function from being performed on memory cell 203.

As noted above, in at least some conventional memory devices, word lines are terminated before a sub word line driver (SWD) gap and are routed to contact SWD circuitry (e.g., from above). As will also be appreciated, in some other devices, word lines may extend through SWD gaps and contact SWD circuitry (e.g., from below), and thus, in these configurations, a word line extends the entire length of a memory bank. A word line extending a length of an entire memory bank (e.g., continuous word line) may eliminate the need to have pull-down devices in each SWD gap, and thus a size of SWD may be reduced. In these configurations, a single pull-down device (e.g., positioned at an edge of a memory bank) may be configured to couple the word line to negative word line voltage VNWL.

Figure 3:
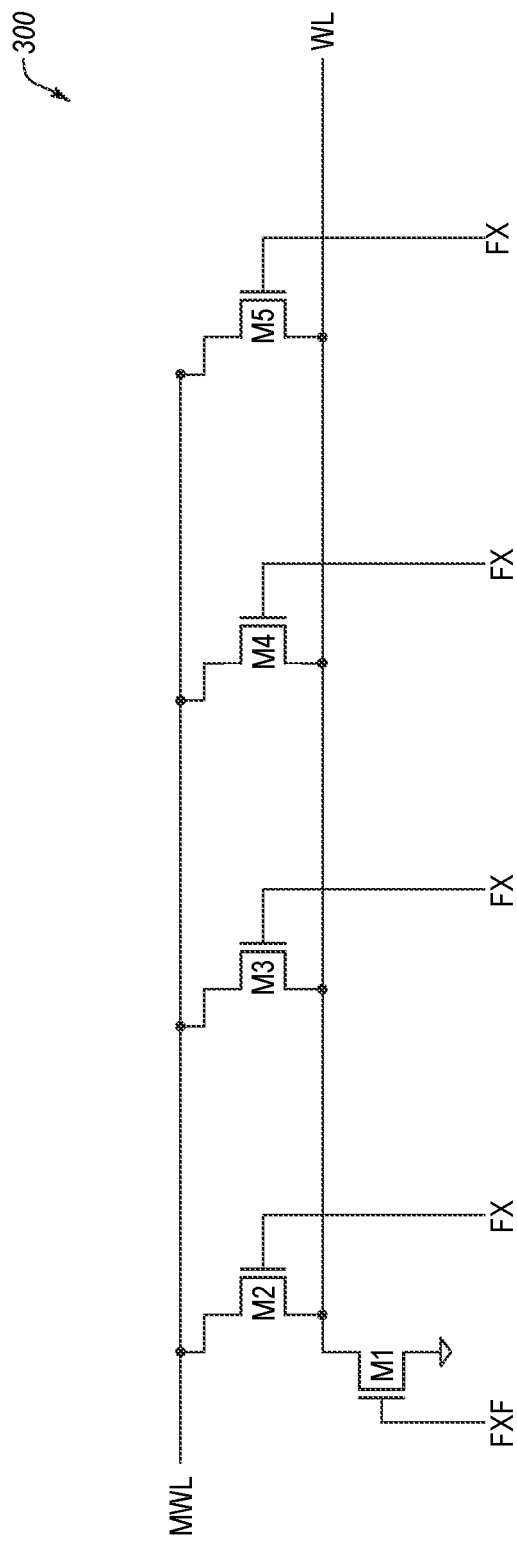
FIG. 3 depicts a number of devices coupled to a main word line and a sub word line, according to various embodiments of the disclosure.

FIG. 3 depicts a circuit 300 including a number of devices coupled to a main word line and a sub word line. More specifically, circuit 300 includes pull-up devices (i.e., transistors M2-M5), a main word line (also commonly referred to as "global word line") MWL, and a sub word line (also commonly referred to as "local word line") WL. Circuit 300 further includes a pull-down device (i.e., transistor M1) configured to couple sub word line WL to a reference voltage (e.g., negative word line voltage VNWL). Each of transistor M2, transistor M3, transistor M4, or transistor M5 may be in a separate SWD gap, and each of transistor M2, transistor M3, transistor M4, or transistor M5 is configured to couple main word line MWL to sub word line WL when sub word line WL is activated.

As will be appreciated, a gate of each of transistor M2, transistor M3, transistor M4, and transistor M5 is configured to receive a driver gate signal FX, and a gate of transistor M1 is configured to receive a driver gate bar signal FXF. As will also be appreciated, sub word line WL shown in FIG. 3 may extend a length of an entire memory bank, and transistor M1, which may be positioned at an edge of the memory bank, is configured to couple sub word line WL to negative word line voltage VNWL while sub word line WL is inactive.

FIG. 4 depicts a memory bank 400 including a number of memory MATS 402. Memory bank 400 further includes a number of even word line drivers 404-408 (i.e., to drive an even word line) and a number of odd word line drivers 409-413 (i.e., to drive an odd word line). As illustrated in FIG. 4, even word line driver 404 at one end of memory bank 400 (i.e., on the left side of FIG. 4) includes a pull-up transistor and a pull-down transistor, and odd word line driver 409 at another, opposite end of memory bank 400 (i.e., on the right side of FIG. 4) includes a pull-up transistor and a pull-down transistor. However, other word line drivers of memory bank 400 include only a pull-up transistor (i.e., to couple an associated word line WL to an associated main word line MWL). In one example wherein the word line drivers of FIG. 3 are even word line drivers, word line driver 404 may include transistors M1 and M2 of FIG. 3, word line driver 405 may transistor M3 of FIG. 3, word line driver 406 may include transistor M4 of FIG. 3, and word line driver 407 may include transistor M5 of FIG. 3.

Due to the sizing of some memory arrays, a single pull-down device (i.e., for weakly coupling a word line to the negative word line voltage in only one of a number of gaps) may not be sufficient to prevent inactive word lines from coupling to an adjacent, active word line. For example, if a first word line word line (e.g., WL 1) is activated (i.e., turned ON), adjacent word lines (e.g., WL 0 and WL 2 may turn ON). More specifically, with reference to FIG. 4, if, for example, word line drivers 409-413 (i.e., odd word line drivers) activate the associated word line (i.e., the odd word line), the word line adjacent thereto (i.e., the even word line driven by word line drivers 404-408) may also couple ON (i.e., due to being weakly coupled to negative word line voltage via word line driver 404 (i.e., via only one gap)). Although adding additional pull-down devices (e.g., in at least some additional gaps) may reduce undesired coupling, additional pull-down devices will increase the size of supporting circuitry and thus array efficiency will be reduced.

FIG. 5 includes a diagram 500 illustrating a conventional control scheme. Diagram 500 includes two main word lines (MWL 0 and MWL 1), driver gate signals FX (i.e., FX 0-FX 7), and word lines WL (i.e., WL 0-WL 15). In one scenario, main word line MWL 0 is turned ON (e.g., at Vccp) and driver gate signal FX 1 is turned ON (e.g., at Vccp+Vt) to activate word line WL 1 (i.e., turn word line WL 1 ON). In this scenario, word lines WL 0 and WL 2, which are adjacent word line WL 1, may also turn ON (i.e., due to being held weakly at negative word line voltage VNWL (i.e., in one gap) and main word line MWL 0 being ON). Further, in this scenario, although driver gate signal FX 1 is turned ON, because main word line MWL 1 is OFF (i.e., LOW), word line WL 9 may not be activated (i.e., word line WL 9 is not turned ON).

FIG. 6 includes an example diagram 600 illustrating a control scheme (also referred to herein as an "addressing scheme"), according to various embodiments of the disclosure. Diagram 600 includes four main word lines (MWL 0, MWL 1, MWL 2, and MWL 3), driver gate signals FX (i.e., FX 0-FX 7), and word lines WL (i.e., WL 0-WL 15). According to various embodiments, in one scenario, main word line MWL 1 is turned ON (e.g., at Vccp) and driver gate signal FX 1 is turned ON (e.g., at Vccp+Vt) to activate word line WL 1 (i.e., turn word line WL 1 ON). Further, in this scenario, according to various embodiments, driver gate signals FX 0 and FX 2, which are adjacent to driver gate signal FX 1 (i.e., the target driver gate signal), are turned ON (e.g., via one or more logic devices) (e.g., at Vccp+Vt) to couple word line WL 0 and WL 2 to main word line MWL 0. Moreover, in this scenario, because main word line MWL 0 is OFF (i.e., LOW), word lines WL 0 and WL 2, which are adjacent word line WL 1, are OFF (e.g., LOW).

More specifically, word lines WL 0 and WL 2 are coupled to an associated main word line in each gap (i.e., due to associated driver signals FX 0 and FX 2 being ON), and the associated main word line MWL 0 is at, for example, negative word line voltage VNWL. Thus, word lines WL 0 and WL 2 are coupled to negative word line voltage VNWL in each SWD gap, and thus word lines WL 0 and WL 2 may not be activated (i.e., word lines WL 0 and WL 2 may not turn ON). Further, word line WL 9 is not activated because main word line MWL 3 is OFF, and word lines WL 8 and WL 10 are not activated because main word line MWL 2 is OFF.

FIG. 7 includes another example diagram 700 illustrating another control scheme (also referred to herein as an "addressing scheme"), in accordance with various embodiments of the disclosure. Diagram 700 includes two main word lines (MWL 0 and MWL 1), driver gate signals FX (i.e., FX 0-FX 15), and word lines WL (i.e., WL 0-WL 15). According to various embodiments, in one scenario, main word line MWL 1 and driver gate signal FX 1 are turned ON to activate word line WL 1 (i.e., main word line MWL 1 and driver signal FX 1 are turned ON to turn word line WL 1 ON). Further, in this scenario, according to various embodiments, driver gate signals FX 0 and FX 2, which are adjacent to driver gate signal FX 1 (i.e., the target driver gate signal), are turned ON (e.g., via one or more logic devices) to couple word line WL 0 and WL 2 to main word line MWL 0. Moreover, in this scenario, because main word line MWL 0 is OFF, word lines WL 0 and WL 2, which are adjacent word line WL 1, are OFF.

More specifically, word lines WL 0 and WL 2 are coupled to an associated main word line in each gap (i.e., due to associated driver gate signals FX 0 and FX 2 being ON), and the associated main word line MWL 0 is at, for example, negative word line voltage VNWL. Thus, word lines WL 0 and WL 2 are coupled to negative word line voltage VNWL in each SWD gap and thus word lines WL 0 and WL 2 may not be activated (i.e., word lines WL 0 and WL 2 may not turn ON). Further, word line WL 9 is not activated because driver gate signal FX 9 is OFF, and word lines WL 8 and WL 10 are not activated because driver gate signals FX 8 and FX 10 are OFF.

With reference again to FIG. 4, according to various embodiments of the disclosure, if, for example, word line drivers 409-413 activate a word line (e.g., the odd word line), the word line adjacent thereto (i.e., the even word line driven by word line drivers 404-408) may be coupled to associated main word lines MWL (i.e., via turning ON associated FX signals (i.e., of word line drivers 404-408)), wherein the associated main word lines MWL (i.e., the one or more main word lines MWL associated with word line drivers 404-408) are at negative word line voltage VNWL. As another example, if, for example, word line drivers 404-408 activate a word line (e.g., the even word line), a word line adjacent thereto (i.e., the odd word line driven by word line drivers 409-413) may be coupled to associated main word lines MWL (i.e., via turning ON associated driver gate FX signals (i.e., of word line drivers 409-413)), wherein the associated main word lines MWL (i.e., the one or more main word lines MWL associated with word line drivers 409-413) are at negative word line voltage VNWL.

It will be appreciated that a number of main word lines used in the control scheme of FIG. 6 is greater than a number of main word lines used in the control scheme of FIG. 7. More specifically, compared to the control scheme of FIG. 7, the control scheme of FIG. 6 utilizes twice as many main word line signals and associated main word line drivers. It will also be appreciated that the number of FX driver gate signals used in the control scheme of FIG. 7 is greater than the number of FX driver gate signals used in the control scheme of FIG. 6. More specifically, compared to the control scheme of FIG. 6, the control scheme of FIG. 7 utilizes twice as many FX driver gates signals and associated drivers.

Figure 8:
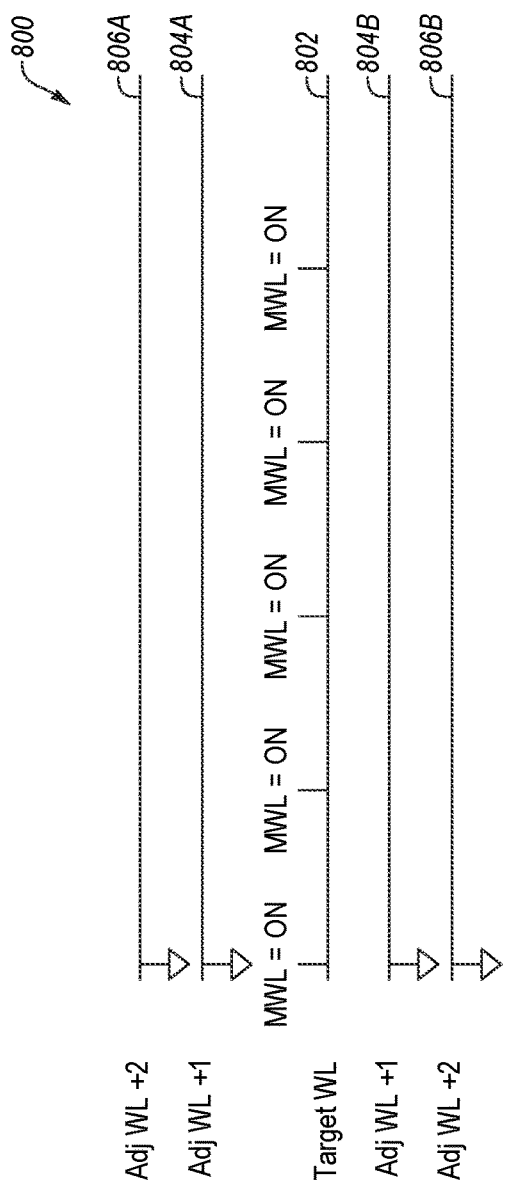
FIG. 8 depicts a number of word lines operated according to a conventional control scheme.

FIG. 8 depicts a number of word lines 800 operated according to a conventional control scheme. More specifically, FIG. 8 depicts a number of word lines including a target word line (i.e., Target WL) 802 and a number of adjacent word lines (i.e., +1 adjacent word lines 804A and 804B and +2 adjacent word lines 806A and 806B). In this control scheme, +1 adjacent word lines 804A and 804B are weakly held at negative word line voltage VNWL (i.e., at one SWD gap), and thus +1 adjacent word lines 804A and 804B may turn ON in response to target word line 802 being ON. Further, +2 adjacent word lines 806A and 806B may also experience coupling and thus +2 adjacent word lines 806A and 806B may also turn ON in response to target word line 802 being ON.

Figure 9:
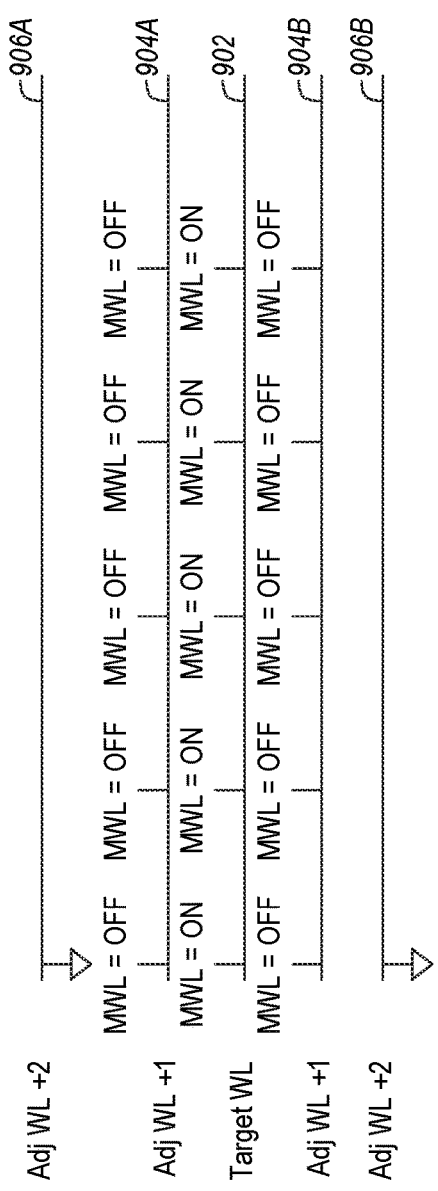
FIG. 9 depicts a number of word lines operated in accordance with various embodiments of the disclosure.

FIG. 9 depicts a number of word lines 900 operated in accordance with various embodiments of the disclosure. More specifically, FIG. 9 depicts a number of word lines including a target word line (i.e., Target WL) 902 and a number of adjacent word lines (i.e., +1 adjacent word lines 904A and 904B and +2 adjacent word lines 906A and 906B). In this control scheme, if target word line 902 is ON, +1 adjacent word lines 904A and 904B are coupled to associated main word lines MWLs (e.g., each SWD gap), which are at negative word line voltage VNWL, and thus +1 adjacent word lines 904A and 904B are strongly held at negative word line voltage VNWL (e.g., in each SWD gap). Further, although +2 adjacent word lines 906A and 906B are weakly held at negative word line voltage VNWL (i.e., via a single pull-down device), +2 adjacent word lines 906A and 906B may be shielded from the target word line 902 via the +1 adjacent word lines 904A and 904B, which, as noted above, are strongly held at negative word line voltage VNWL.

Figure 10B:
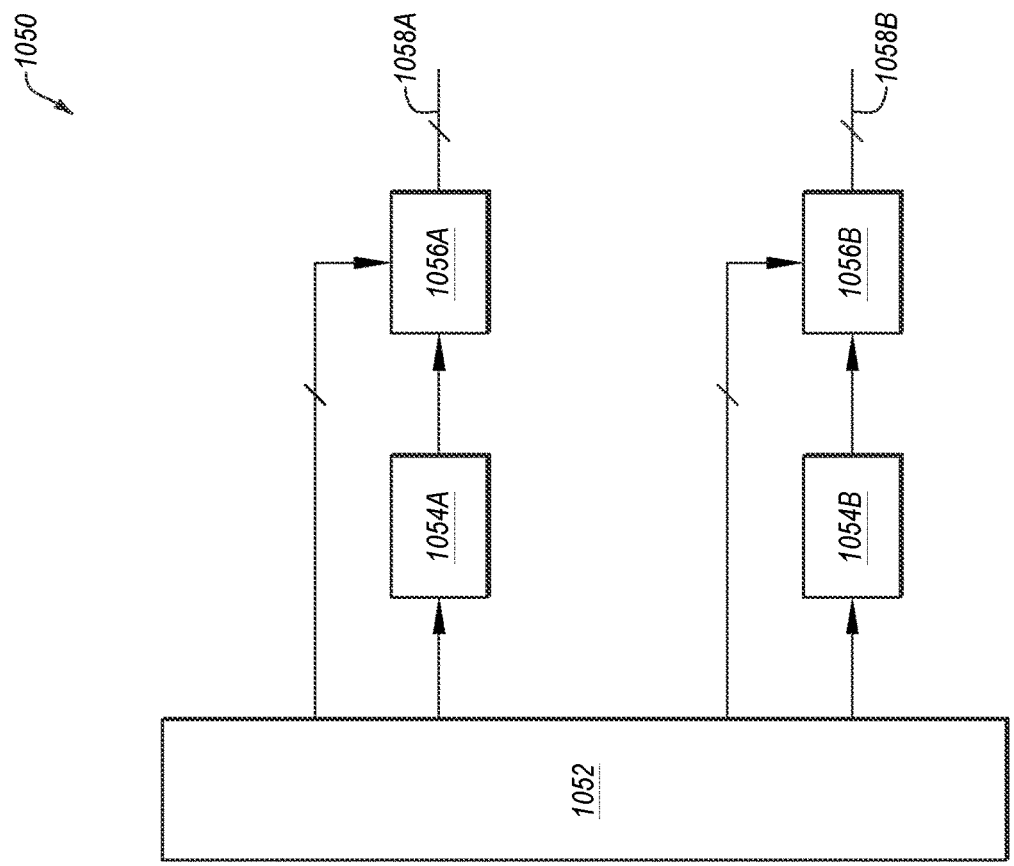
FIG. 10B is a block diagram of a portion of another example device, according to various embodiments of the disclosure.
Figure 10A:
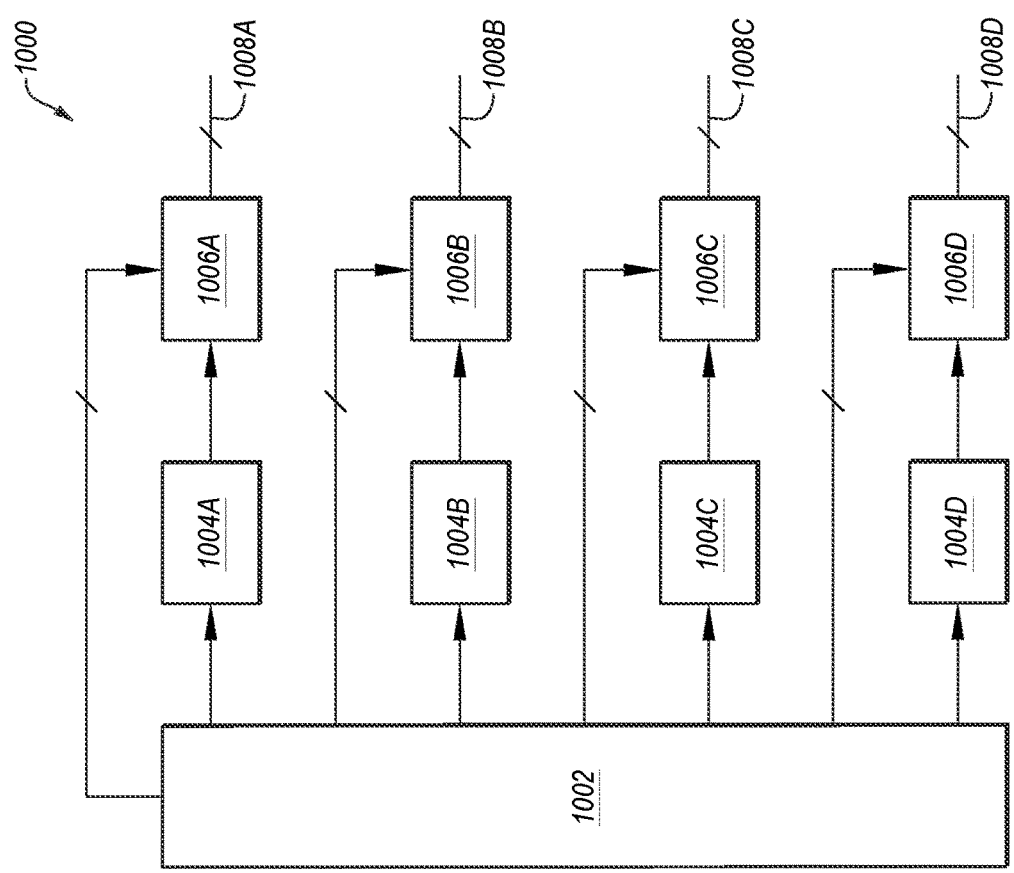
FIG. 10A is a block diagram of a portion of an example device, according to various embodiments of the disclosure.

FIG. 10A is a block diagram of a portion of an example device 1000, according to various embodiments of the disclosure. Device 1000 includes circuitry 1002, main word line drivers 1004A-1004D, and drivers 1006A-1006D. Circuitry 1002, which may include logic and/or other circuitry, may be configured to generate main word line signals and driver gate signals (e.g., driver gate signals FX and FXF). It is noted each driver 1006A-1006D may include a number of (e.g., four) sub word line drivers. Thus, in this example, each main word line driver 1004 is configured to drive a number of (e.g., four) sub word lines.

According to one example, device 1000, which may be part of a memory device (e.g., memory device 100 of FIG. 1), may be configured to carry out the control scheme described above with reference to FIG. 6. More specifically, circuitry 1002 may be configured to convey one or more control signals to each of main word line drivers 1004A-1004D for generating associated main word line signals. More specifically, with reference to FIGS. 6 and 10A, circuitry 1002 may convey one or more control signals to main word line driver 1004A, which may generate and convey main word line signal MWL 0 to drivers 1006A. In this example, drivers 1006A may include four sub word line drivers (i.e., for generating word lines WL 0, WL 2, WL 4, and WL 6 shown in FIG. 6). Circuitry 1002 may also convey one or more control signals to main word line driver 1004B, which may generate and convey main word line signal MWL 1 to drivers 1006B. In this example, drivers 1006B may include four sub word line drivers (i.e., for generating word lines WL 1, WL 3, WL 5, and WL 7 shown in FIG. 6).

Circuitry 1002 may also convey one or more control signals to main word line driver 1004C, which may generate and convey main word line signal MWL 2 to drivers 1006C. In this example, drivers 1006C may include four sub word line drivers (i.e., for generating word lines WL 8, WL 10, WL 12, and WL 14 shown in FIG. 6). Also, circuitry 1002 may also convey one or more control signals to main word line driver 1004D, which may generate and convey main word line signal MWL 3 to drivers 1006D. In this example, drivers 1006D may include four sub word line drivers (i.e., for generating word lines WL 9, WL 11, WL 13, and WL 15 shown in FIG. 6).

Moreover, circuitry 1002 may be configured to convey driver gate signals to drivers 1006A-1006D. More specifically, with continued reference to FIGS. 6 and 10A, circuitry 1002 may convey driver gate signals FX 0, FX 2, FX 4, and FX 6 to drivers 1006A (e.g., for generating word lines WL 0, WL 2, WL 4, and WL 6 shown in FIG. 6). Further, circuitry 1002 may convey driver gate signals FX 1, FX 3, FX 5, and FX 7 to drivers 1006B (e.g., for generating word lines WL 1, WL 3, WL 5, and WL 7 shown in FIG. 6). Circuitry 1002 may also convey driver gate signals FX 0, FX 2, FX 4, and FX 6 to drivers 1006C (e.g., for generating word lines WL 8, WL 10, WL 12, and WL 14 shown in FIG. 6). Moreover, circuitry 1002 may also convey driver gate signals FX 1, FX 3, FX 5, and FX 7 to drivers 1006D (e.g., for generating word lines WL 9, WL 11, WL 13, and WL 15 shown in FIG. 6).

Drivers 1006A, which, as noted above, may include four sub word line drivers, are configured to generate a number of word lines 1008A, drivers 1006B, which, as noted above, may include four sub word line drivers, are configured to generate a number of word lines 1008B, drivers 1006C, which, as noted above, may include four sub word line drivers, are configured to generate a number of word lines 1008C, and drivers 1006D, which, as noted above, may include four sub word line drivers, are configured to generate a number of word lines 1008D.

More specifically, for example, in response to main word line MWL 0 and driver gate signal FX 0, a sub word line driver of driver 1006A may generate word line WL 0. As another example, in response to main word line MWL 0 and driver gate signal FX 2, another sub word line driver of driver 1006A may generate word line WL 2. As another example, in response to main word line MWL 2 and driver gate signal FX 2, a sub word line driver of driver 1006C may generate word line WL 10. As yet another example, in response to main word line MWL 3 and driver gate signal FX 5, a sub word line driver of driver 1006D may generate word line WL 13.

With continued reference to FIGS. 6 and 10A, in one contemplated operation wherein word line WL 1 is a target word line, circuitry 1002 may convey one or more control signals to main word line driver 1004B, which may generate and convey main word line signal MWL 1 to a sub word line driver of drivers 1006B. Further, circuitry 1002 may convey driver gate signal FX 1 to the sub word line driver of drivers 1006B to couple word line WL 1 to main word line signal MWL 1 (i.e., to activate word line WL 1). Moreover, in this example, circuitry 1002 may convey driver gate signals FX 0 and FX 2 to sub word line drivers of drivers 1006A for coupling word lines WL 0 and WL 2 to an associated main word line (i.e., main word line MWL 0 in this example). Further, circuitry 1002 may couple main word line MWL 0 to negative word line voltage VNWL.

FIG. 10B is a block diagram of a portion of another example device 1050, according to various embodiments of the disclosure. Device 1050 includes circuitry 1052, main word line drivers 1054A and 1054B, and drivers 1056A and 1056B. Circuitry 1052, which may include logic and/or other circuitry, may be configured to generate main word line signals and driver gate signals (e.g., driver gate signals FX). It is noted each driver 1056A and 1056B may include a number of (e.g., eight) sub word line drivers. Thus, in one example, each main word line driver 1054 is configured to drive eight sub word lines.

According to one example, device 1050, which may be part of a memory device (e.g., memory device 100 of FIG. 1), may be configured to carry out the control scheme described above with reference to FIG. 7. More specifically, circuitry 1052 may be configured to convey one or more control signals to each of main word line drivers 1054A and 1054B for generating associated main word line signals. More specifically, with reference to FIGS. 7 and 10B, circuitry 1052 may convey one or more control signals to main word line driver 1054A, which may generate and convey main word line signal MWL 0 to drivers 1056A. In this example, drivers 1056A may include eight sub word line drivers (i.e., for generating word lines WL 0, WL 2, WL 4, WL 6, WL 8, WL 10, WL 12, and WL 14 shown in FIG. 7). Circuitry 1052 may also convey one or more control signals to main word line driver 1054B, which may generate and convey main word line signal MWL 1 to drivers 1056B. In this example, drivers 1056B may include eight sub word line drivers (i.e., for generating word lines WL 1, WL 3, WL 5, WL 7, WL 9, WL 11, WL 13, and WL 15 shown in FIG. 7).

Moreover, circuitry 1052 may be configured to convey driver gate signals to drivers 1056A and 1056B. More specifically, with continued reference to FIGS. 7 and 10B, circuitry 1052 may convey driver gate signals FX 0, FX 2, FX 4, FX 6, FX 8, FX 10, FX 12, and FX 14 to drivers 1056A (e.g., for generating word lines WL 0, WL 2, WL 4, WL 6, WL 8, WL 10, WL 12, and WL 14 shown in FIG. 7). Further, circuitry 1052 may convey driver gate signals FX 1, FX 3, FX 5, FX 7, FX 9, FX 11, FX 13, and FX 15 to drivers 1056B (e.g., for generating word lines WL 1, WL 3, WL 5, WL 7, WL 9, WL 11, WL 13, and WL 15 shown in FIG. 7).

Drivers 1056A, which, as noted above, may include eight sub word line drivers, are configured to generate a number of word lines 1058A, and drivers 1056B, which, as noted above, may include eight sub word line drivers, are configured to generate a number of word lines 1058B. More specifically, for example, in response to main word line MWL 0 and driver gate signal FX 0, a sub word line driver of driver 1056A may generate word line WL 0. As another example, in response to main word line MWL 0 and driver gate signal FX 2, another sub word line driver of driver 1056A may generate word line WL 2. As another example, in response to main word line MWL 1 and driver gate signal FX 9, a sub word line driver of driver 1056B may generate word line WL 9. As yet another example, in response to main word line MWL 1 and driver gate signal FX 15, a sub word line driver of driver 1056B may generate word line WL 15.

With continued reference to FIGS. 7 and 10B, in one contemplated operation wherein word line WL 1 is a target word line, circuitry 1052 may convey one or more control signals to main word line driver 1054B, which may generate and convey main word line signal MWL 1 to a sub word line driver of drivers 1056B. Further, circuitry 1052 may convey driver gate signal FX 1 to the sub word line driver of drivers 1056B to couple word line WL 1 to main word line signal MWL 1 (i.e., to activate word line WL 1). Moreover, in this example, circuitry 1052 may convey driver gate signals FX 0 and FX 2 to sub word line drivers of drivers 1056A for coupling word lines WL 0 and WL 2 to an associated main word line (i.e., main word line MWL 0 in this example). Further, circuitry 1052 may couple main word line MWL 0 to negative word line voltage VNWL.

Figure 11:
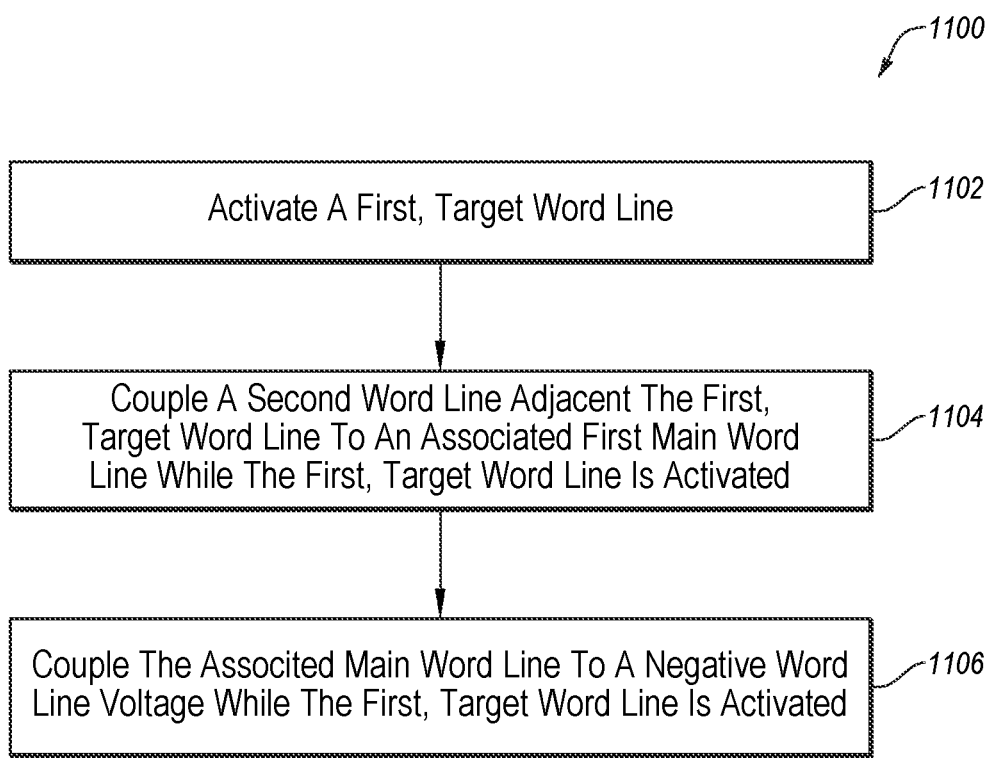
FIG. 11 is a flowchart of an example method of operating a memory device, in accordance with various embodiments of the disclosure.

FIG. 11 is a flowchart of an example method 1100 of operating a memory device, in accordance with various embodiments of the disclosure. Method 1100 may be arranged in accordance with at least one embodiment described in the disclosure. Method 1100 may be performed, in some embodiments, by a circuit, a device, or a system, such as memory device 100 of FIG. 1, memory device 200 of FIG. 2, memory bank 400 of FIG. 4, word lines 900 of FIG. 9, device 1000 of FIG. 10A, device 1050 of FIG. 10B, memory device 1200 of FIG. 12, and/or electronic system 1300 of FIG. 13, or another device or system. Although illustrated as discrete blocks, various blocks may be divided into additional blocks, combined into fewer blocks, or eliminated, depending on the desired implementation.

Method 1100 may begin at block 1102, wherein, a first, target word line is activated, and method 1100 may proceed to block 1104. For example, with reference to FIG. 6 and/or FIG. 7, word line WL 1 may be activated (i.e., turned ON) via turning main word line MWL 1 and driver gate signal FX 1 ON. As another example, with reference to FIG. 9, target word line 902 may be activated.

At block 1104, a second word line that is adjacent the first, target word line may be coupled to an associated first main word line while the first, target word line is activated, and method 1100 may proceed to block 1106. For example, with reference to FIG. 6 and/or FIG. 7, word line WL 0 may be coupled to main word line MWL 0 and/or word line WL 2 may be coupled to main word line MWL 0. As another example, with reference to FIG. 9, word line 904A may be coupled to an associated main word line and/or word line 904B may be coupled to an associated main word line.

At block 1106, the associated main word line may be coupled to a negative word line voltage while the first, target word line is activated. For example, with reference to FIG. 6 and/or FIG. 7, main word line MLW 0 may be coupled to the negative word line voltage. As another example, with reference to FIG. 9, main word line MWL associated with word lines 904A and 904B may be coupled to the negative word line voltage (e.g., main word line MWL associated with word lines 904A and 904B is OFF).

Modifications, additions, or omissions may be made to method 1100 without departing from the scope of the disclosure. For example, the operations of method 1100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, method 1100 may include one or more acts wherein a third word line adjacent the first, target word line is coupled to an associated second main word line while the first, target word line is activated. As another example, method 1100 may include one or more acts wherein the associated second main word line is coupled to the negative word line voltage while the first, target word line is activated.

A memory device is also disclosed. According to various embodiments, the memory device may include one or more memory cell arrays, such as memory cell array 102 (see FIG. 1). The one or more memory cell arrays may include a number of memory cells.

Figure 12:
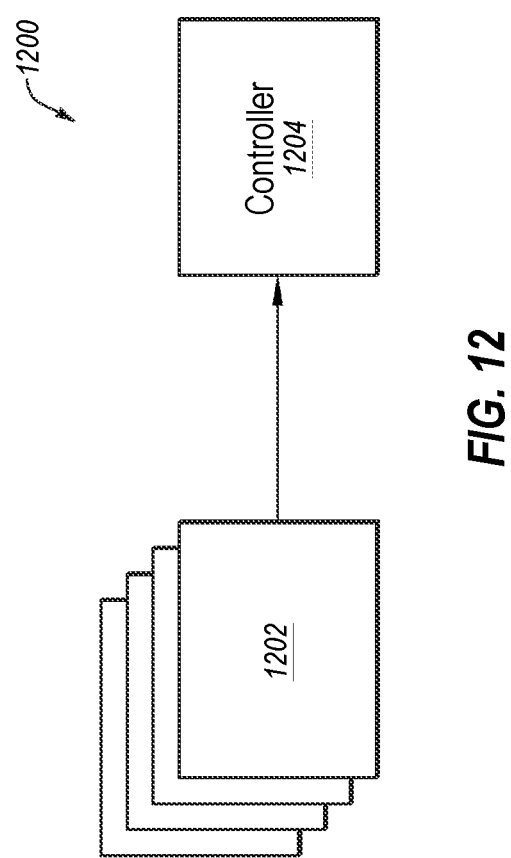
FIG. 12 is a simplified block diagram of an example memory device, in accordance with various embodiments of the disclosure.

FIG. 12 is a simplified block diagram of a memory device 1200 implemented according to one or more embodiments described herein. Memory device 1200, which may include, for example, a semiconductor device, includes a memory array 1202 and a controller 1204. Memory array 1202, which may include a number of memory banks, may include a number of memory cells.

Controller 1204 may be operatively coupled with memory array 1202 so as to read, write, or refresh any or all memory cells within memory array 1202. Controller 1204 may be configured for carrying out one or more embodiments disclosed herein. For example, in some embodiments, controller 1204 may include at least a portion of, for example, driver control circuitry 210 of FIG. 2, at least a portion of device 1000 of FIG. 10A, and/or at least a portion of device 1050 of FIG. 10B.

A system is also disclosed. According to various embodiments, the system may include a memory device including a number of memory banks, each memory bank having an array of memory cells. Each memory cell may include an access transistor and a storage element operably coupled with the access transistor.

Figure 13:
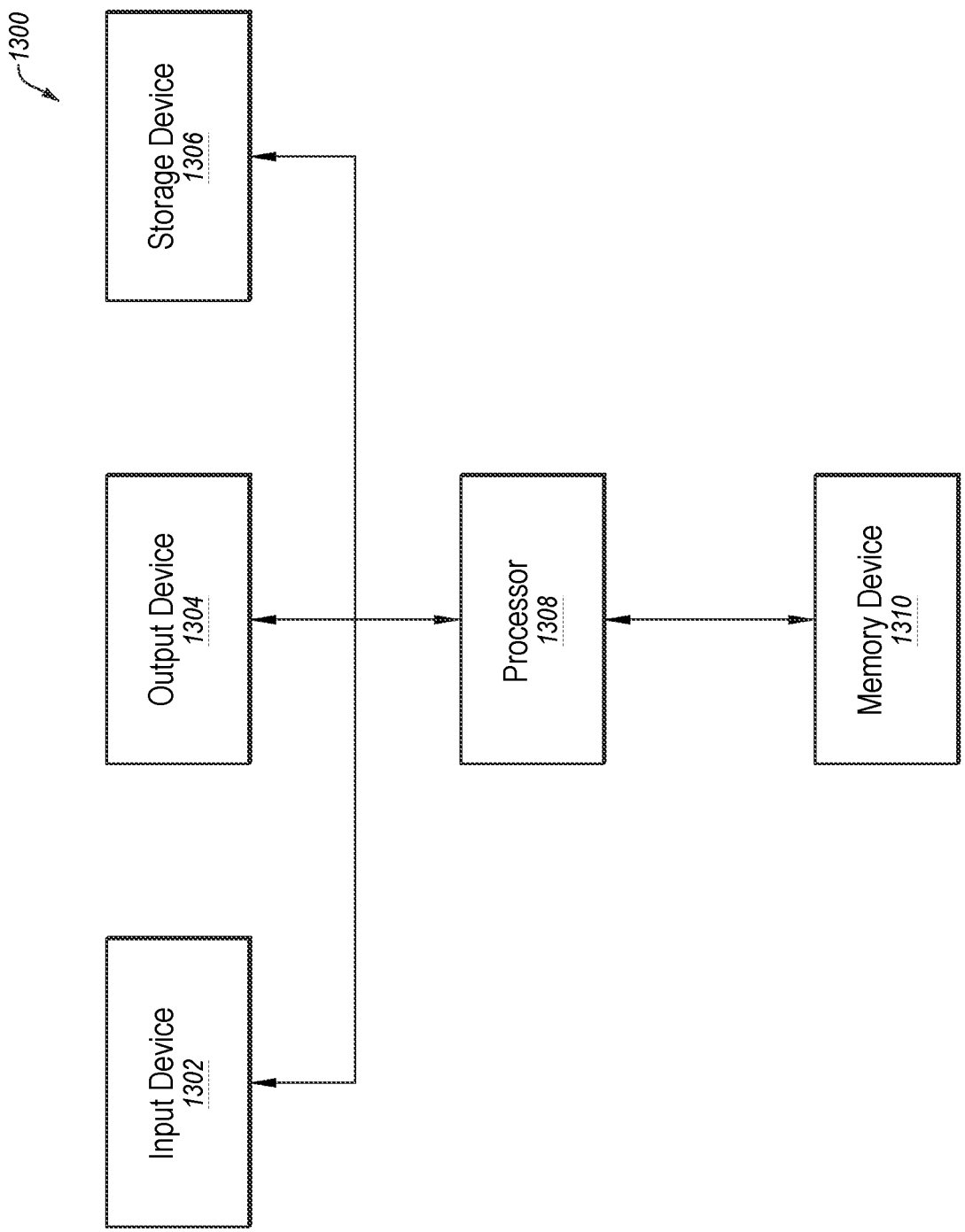
FIG. 13 is a simplified block diagram of an example electronic system, in accordance with various embodiments of the disclosure.

FIG. 13 is a simplified block diagram of an electronic system 1300 implemented according to one or more embodiments described herein. Electronic system 1300 includes at least one input device 1302, which may include, for example, a keyboard, a mouse, or a touch screen. Electronic system 1300 further includes at least one output device 1304, such as a monitor, a touch screen, or a speaker. Input device 1302 and output device 1304 are not necessarily separable from one another. Electronic system 1300 further includes a storage device 1306. Input device 1302, output device 1304, and storage device 1306 may be coupled to a processor 1308. Electronic system 1300 further includes a memory device 1310 coupled to processor 1308. Memory device 1310, which may include memory device 1200 of FIG. 12, may include an array of memory cells. Electronic system 1300 may include, for example, a computing, processing, industrial, or consumer product. For example, without limitation, electronic system 1300 may include a personal computer or computer hardware component, a server or other networking hardware component, a database engine, an intrusion prevention system, a handheld device, a tablet computer, an electronic notebook, a camera, a phone, a music player, a wireless device, a display, a chip set, a game, a vehicle, or other known systems.

Various embodiments of the disclosure may include a device including a number of word lines and circuitry coupled to the number of word lines. The circuitry may be configured to activate a target word line of the number of word lines. The circuitry may also be configured to couple at least one word line of the number of word lines adjacent the target word line to an associated main word line while the target word line is activated.

One or more other embodiments of the disclosure include a method of operating a memory device. The method may include activating a first, target word line. The method may also include coupling a second word line adjacent the first, target word line to an associated first main word line while the first, target word line is activated. Further, the method may include coupling the associated main word line to a negative word line voltage while the first, target word line is activated.

Additional embodiments of the disclosure include an electronic system. The electronic system may include at least one input device, at least one output device, and at least one processor device operably coupled to the input device and the output device. The electronic system may also include at least one memory device operably coupled to the at least one processor device and including at least one input device, at least one output device, at least one processor device operably coupled to the input device and the output device, and at least one memory device operably coupled to the at least one processor device. The memory device may include a group of word lines including even numbered word lines and odd numbered word lines. The memory device may also include a group of word line drivers including even numbered word line drivers coupled to the even numbered word lines and odd numbered word line drivers coupled to the odd numbered word lines. The even numbered word line drivers may be coupled to a first common source signal, and each of the even numbered word line drivers may be configured to receive a corresponding one of a number of first control signals. The odd numbered word line drivers may be coupled to a second common source signal, and each of the odd numbered word line drivers may be configured to receive a corresponding one of a number of second control signals.

In accordance with common practice, the various features illustrated in the drawings may not be drawn to scale. The illustrations presented in the disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

As used herein, the term "device" or "memory device" may include a device with memory, but is not limited to a device with only memory. For example, a device or a memory device may include memory, a processor, and/or other components or functions. For example, a device or memory device may include a system on a chip (SOC).

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A device, comprising:
a number of word lines; and
circuitry coupled to the number of word lines and configured to:
activate a target word line of the number of word lines; and
couple a specific word line of the number of word lines adjacent the target word line to an associated main word line while the target word line is activated, wherein the specific word line extends a length of an associated memory bank such that the specific word line extends through a plurality of gaps of a sub word line driver (SWD) and couples, via the associated main word line, to a negative word line voltage independently in each gap of the plurality of gaps of the SWD while the target word line is activated.

2. The device of claim 1, wherein the associated main word line is at the negative word line voltage while the target word line is activated.

3. The device of claim 1, further comprising a second word line of the number of word lines, wherein the circuitry is configured to couple each of the specific word line and the second word line to associated main word lines while the target word line is activated.

4. The device of claim 3, wherein the circuitry is configured to convey a driver gate signal to associated word line drivers to couple each of the specific word line and the second word line to the associated main word lines via associated NMOS transistors.

5. The device of claim 1, wherein the circuitry is further configured to couple the associated main word line to the negative word line voltage.

6. The device of claim 1, wherein the circuitry is configured to couple the specific word line to the associated main word line at each gap of the number of gaps of the SWD.

7. A method of operating a memory device, comprising:
activating a first, target word line;
coupling a second word line extending through a plurality of gaps of a sub word line driver (SWD) and adjacent the first, target word line to an associated first main word line at each of the plurality of gaps of the SWD while the first, target word line is activated; and
coupling the associated first main word line to a negative word line voltage such that the second word line is coupled, via the associated main word line, to the negative word line voltage independently in each gap of the plurality of gaps of the SWD while the first, target word line is activated.

8. The method of claim 7, further comprising:
coupling a third word line adjacent the first, target word line to an associated second main word line while the first, target word line is activated; and
coupling the associated second main word line to the negative word line voltage while the first, target word line is activated.

9. The method of claim 8, wherein:
coupling the second word line to the associated first main word line comprises coupling the second word line adjacent a first side of the first, target word line to the associated first main word line; and
coupling the third word line to the associated second main word line comprises coupling the third word line adjacent a second, opposite side of the first, target word line to the associated second main word line.

10. The method of claim 8, wherein coupling the third word line to the associated second main word line comprises conveying a driver gate signal to a gate of an NMOS transistor to couple the third word line to the associated second main word line.

11. The method of claim 7, wherein coupling the second word line to the associated first main word line comprises coupling the second word line to the associated first main word line via an NMOS transistor.

12. The method of claim 7, wherein coupling the second word line to the associated first main word line comprises conveying a driver gate signal to a gate of an NMOS transistor to couple the second word line to the associated first main word line.

13. The method of claim 7, wherein activating the first, target word line comprises conveying a driver gate signal to a pull-up transistor of an associated word line driver to activate the first, target word line.

* * * * *